(12) United States Patent
Müller et al.

(10) Patent No.: US 10,718,316 B2
(45) Date of Patent: Jul. 21, 2020

(54) METHOD FOR PREDICTING THE ACCUMULATION OF ICE ON A ROTOR BLADE OF A WIND TURBINE AND THE USE THEREOF

(71) Applicant: FOS4X GMBH, Munich (DE)

(72) Inventors: Mathias Müller, Munich (DE);
Thomas Schauss, Gilching (DE);
Florian Rieger, Munich (DE); Mathias Schubert, Rendsburg (DE)

(73) Assignee: FOS4X GMBH, Munich (DE)

( * ) Notice: Subject to any disclaimer, the term of this patent is extended or adjusted under 35 U.S.C. 154(b) by 125 days.

(21) Appl. No.: 16/066,815

(22) PCT Filed: Dec. 5, 2016

(86) PCT No.: PCT/EP2016/079760
§ 371 (c)(1),
(2) Date: Jun. 28, 2018

(87) PCT Pub. No.: WO2017/114639
PCT Pub. Date: Jul. 6, 2017

(65) Prior Publication Data
US 2019/0010932 A1  Jan. 10, 2019

(30) Foreign Application Priority Data
Dec. 29, 2015  (DE) .......... 10 2015 122 932

(51) Int. Cl.
*F03D 80/40* (2016.01)
*F03D 17/00* (2016.01)

(52) U.S. Cl.
CPC ............. *F03D 80/40* (2016.05); *F03D 17/00* (2016.05); *F05B 2260/80* (2013.01);
(Continued)

(58) Field of Classification Search
CPC .................. F03D 80/40; F05B 2260/80; F05B 2260/821; F05B 2270/404
See application file for complete search history.

(56) References Cited

U.S. PATENT DOCUMENTS

| | | | |
|---|---|---|---|
| 8,434,360 B2 * | 5/2013 | Cheng ................ | F03D 80/40 73/170.26 |
| 8,662,842 B2 * | 3/2014 | Oing ................... | F03D 7/0296 416/1 |

(Continued)

FOREIGN PATENT DOCUMENTS

| | | |
|---|---|---|
| CN | 1707262 A | 12/2005 |
| CN | 101206161 A | 6/2008 |

(Continued)

OTHER PUBLICATIONS

China National Intellectual Property Administration Search Report on application No. 201680076770.1 dated Jul. 19, 2019.
(Continued)

*Primary Examiner* — Ninh H. Nguyen
(74) *Attorney, Agent, or Firm* — Moser Taboada

(57) ABSTRACT

Embodiments describe a method for predicting the accumulation of ice on a rotor blade (111, 112) of a wind turbine (100) and the use thereof. The method comprises defining an upper threshold value (So) and/or a lower threshold value (Su) for a system variable (S) which is associated with the mass of the rotor blade (111, 112) and/or with the mass of an ice attachment (1) of the rotor blade (111, 112); acquiring system variable data during an acquisition time period (T); carrying out a compensation calculation of the curve profile for a prediction time period (Δt1', Δt2', Δt3') from the system variable data which were acquired during a partial time period (Δt1, Δt2, Δt3) of the acquisition time period (T) in order to obtain a prediction curve (N1, N2, N3); carrying out at least one further compensation calculation of the curve (Continued)

profile for a further prediction time period ($\Delta t1'$, $\Delta t2'$, $\Delta t3'$) from the system variable data which were acquired during another partial time period ($\Delta t1$, $\Delta t2$, $\Delta t3$) of the acquisition time period (T) in order to obtain a further prediction curve (N1, N2, N3); determining whether or not the upper threshold value (So) will be exceeded by one or more of the prediction curves (N1, N2, N3) in future and/or whether the lower threshold value (Su) will not be undershot by one or more of the prediction curves (N1, N2, N3) in the future; and outputting the result of the determination; and outputting the result of the determination.

19 Claims, 4 Drawing Sheets

(52) U.S. Cl.
CPC ... *F05B 2260/821* (2013.01); *F05B 2270/334* (2013.01); *F05B 2270/404* (2013.01); *Y02E 10/72* (2013.01)

(56) References Cited

U.S. PATENT DOCUMENTS

| | | |
|---|---|---|
| 2008/0152493 A1 | 12/2008 | Sundermann et al. |
| 2012/0076651 A1 | 3/2012 | Laurberg |
| 2012/0226485 A1 | 9/2012 | Creagh et al. |
| 2013/0031966 A1 | 2/2013 | Egedal et al. |
| 2013/0195657 A1* | 8/2013 | Lauritsen ............. F03D 7/042 416/1 |

FOREIGN PATENT DOCUMENTS

| | | |
|---|---|---|
| CN | 102834610 A | 12/2012 |
| DE | 102005016524 A1 | 12/2005 |
| DE | 102013223294 A1 | 5/2015 |
| EP | 2511524 A1 | 10/2012 |

OTHER PUBLICATIONS

German Patent Examination Report dated Sep. 7, 2016 for Patent Application No. 10 2015 122 932.3.
International Search Report and Written Opinion dated Mar. 2, 2017 for PCT Application No. PCT/EP2016/079760.

* cited by examiner

METHOD FOR PREDICTING THE ACCUMULATION OF ICE ON A ROTOR BLADE OF A WIND TURBINE AND THE USE THEREOF

TECHNICAL FIELD

Embodiments of the present disclosure relate to a method for predicting the accumulation of ice on a rotor blade of a wind turbine and to the use of a method for predicting the accumulation of ice on a rotor blade of a wind turbine.

Rotor blades of wind turbines are exposed to weather conditions of the environment without protection. In certain locations, it may be that ice accumulates on the rotor blades at correspondingly low environmental temperatures and sufficiently high air humidity or when a rainfall occurs. With an increasing size of the rotor blades of wind turbines, the surface thereof increases so that the risk that ice is accumulated, i.e. the development of ice accretion on the rotor blades is increased.

Ice accumulation constitutes a potential danger for the environment of the wind turbine, on the one hand, since, when the ice accumulation is thrown off—during operation or at standstill of the plant—the thrown-off pieces of ice may endanger persons or objects in the throw-off radius. On the other hand, a non-uniform accumulation of ice may in particular result in an imbalance of the rotor of the wind turbine, which might lead to damage during the operation of the wind turbine.

PRIOR ART

It is known to evaluate data of a wind turbine in order to draw conclusions as to an already occurred ice accumulation. DE 10 2005 016 524 A1 discloses a method for detecting ice on a wind turbine, in which both meteorological conditions associated with icing states, and one or more physical, characteristic variables of the wind turbine are monitored during operation which indicate a change of mass of the rotor blades of the wind turbine.

The known methods for instance have the disadvantage that only an already existing ice accumulation can be detected, which already constitutes an operational hazard. Often, however, it is desirable to predict for the future, whether and, if necessary, at what time an appreciable accumulation of ice will take place, which could constitute an operational hazard, for example. Likewise, it is often desirable to predict for the future, whether and, if necessary, at what time an appreciable accumulation of ice, which could constitute an operational hazard, for example, will no longer be present.

A solution should therefore be proposed which allows the accumulation of ice on a rotor blade of a wind turbine to be predicted reliably.

SUMMARY

Embodiments of the present disclosure provide a method for predicting the accumulation of ice on a rotor blade of a wind turbine according to claim 1. Furthermore, embodiments of the present disclosure propose a use of the method described herein for determining the operating parameters of a rotor blade de-icing device according to claim 13, which are required for a de-icing process.

According to an embodiment a method for predicting the accumulation of ice on a rotor blade of a wind turbine is proposed, comprising defining an upper threshold value and/or a lower threshold value for a system variable which is associated with the mass of the rotor blade and/or with the mass of an ice attachment of the rotor blade; acquiring system variable data during an acquisition time period; carrying out a compensation calculation of the curve profile for a prediction time period from the system variable data which were acquired during a partial time period of the acquisition time period in order to obtain a prediction curve; carrying out at least one further compensation calculation of the curve profile for a further prediction time period from the system variable data which were acquired during another partial time period of the acquisition time period in order to obtain a further prediction curve; determining whether or not the upper threshold value will be exceeded by one or more of the prediction curves in the future and/or whether or not the lower threshold value will be undershot by one or more of the prediction curves in the future; and outputting the result of the determination.

According to a further embodiment, a use of a method for predicting the accumulation of ice on a rotor blade of a wind turbine for detecting the operating parameters of a rotor blade de-icing device which are required for a de-icing process is proposed, the method comprising: defining an upper threshold value and/or a lower threshold value for a system variable which is associated with the mass of the rotor blade and/or with the mass of an ice attachment of the rotor blade; acquiring system variable data during an acquisition time period; carrying out a compensation calculation of the curve profile for a prediction time period from the system variable data which were acquired during a partial time period of the acquisition time period in order to obtain a prediction curve; carrying out at least one further compensation calculation of the curve profile for a further prediction time period from the system variable data which were acquired during another partial time period of the acquisition time period in order to obtain a further prediction curve; determining whether or not the upper threshold value will be exceeded by one or more of the prediction curves in the future and/or whether or not the lower threshold value will be undershot by one or more of the prediction curves in the future; and outputting the result of the determination.

BRIEF DESCRIPTION OF THE DRAWINGS

Embodiments of the invention are illustrated in the drawings and explained in more detail in the following description. Shown are in the drawings.

DESCRIPTION OF THE EMBODIMENTS

Figure 1:
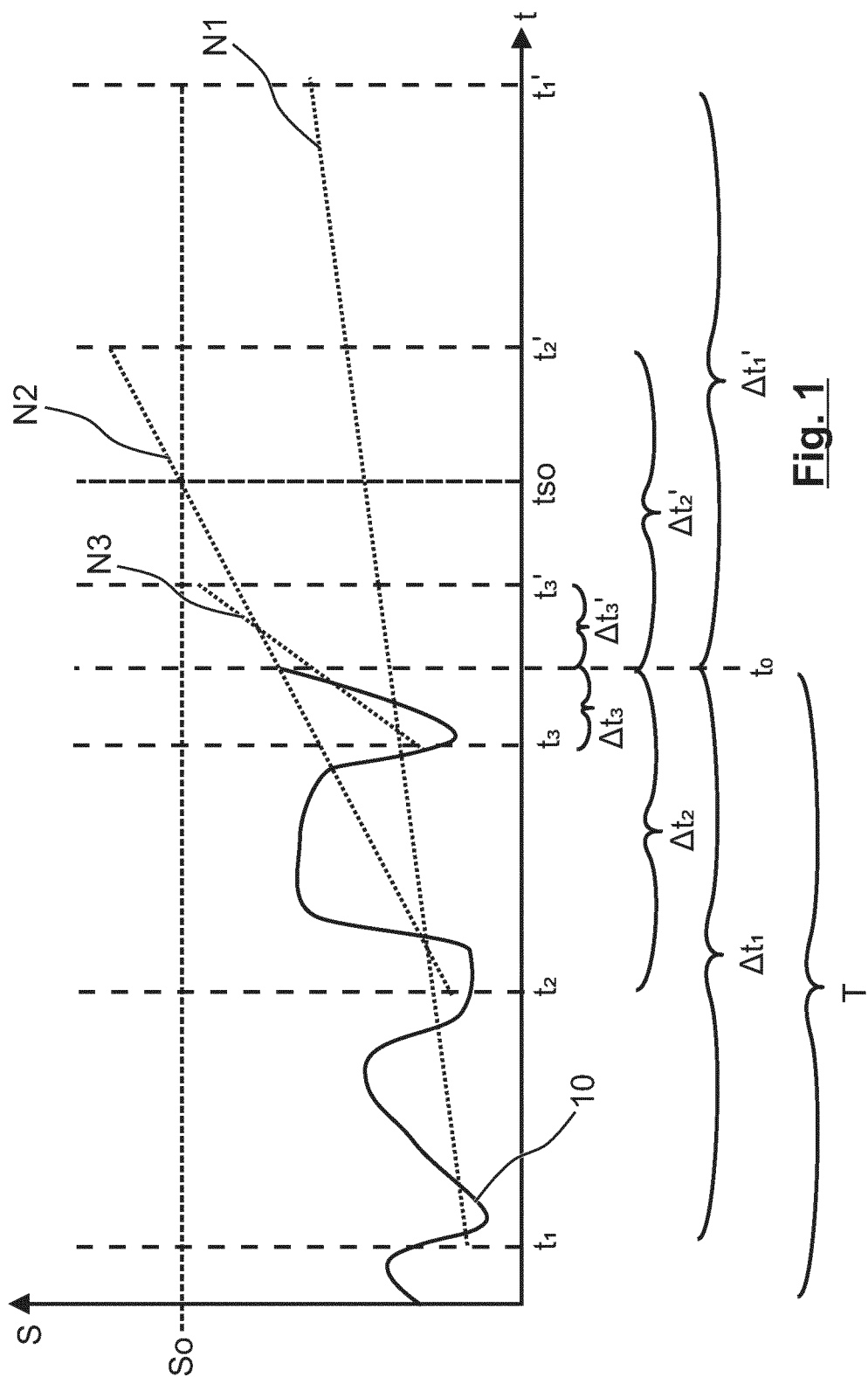
FIG. 1 a diagram of a system variable over time for explaining a method for predicting the accumulation of ice on a rotor blade of a wind turbine according to an embodiment.

Embodiments of the disclosure will be explained in more detail below. The drawings serve to illustrate one or more examples of embodiments. In the drawings, identical reference numerals designate identical or similar features of the respective embodiments.

Figure 2:
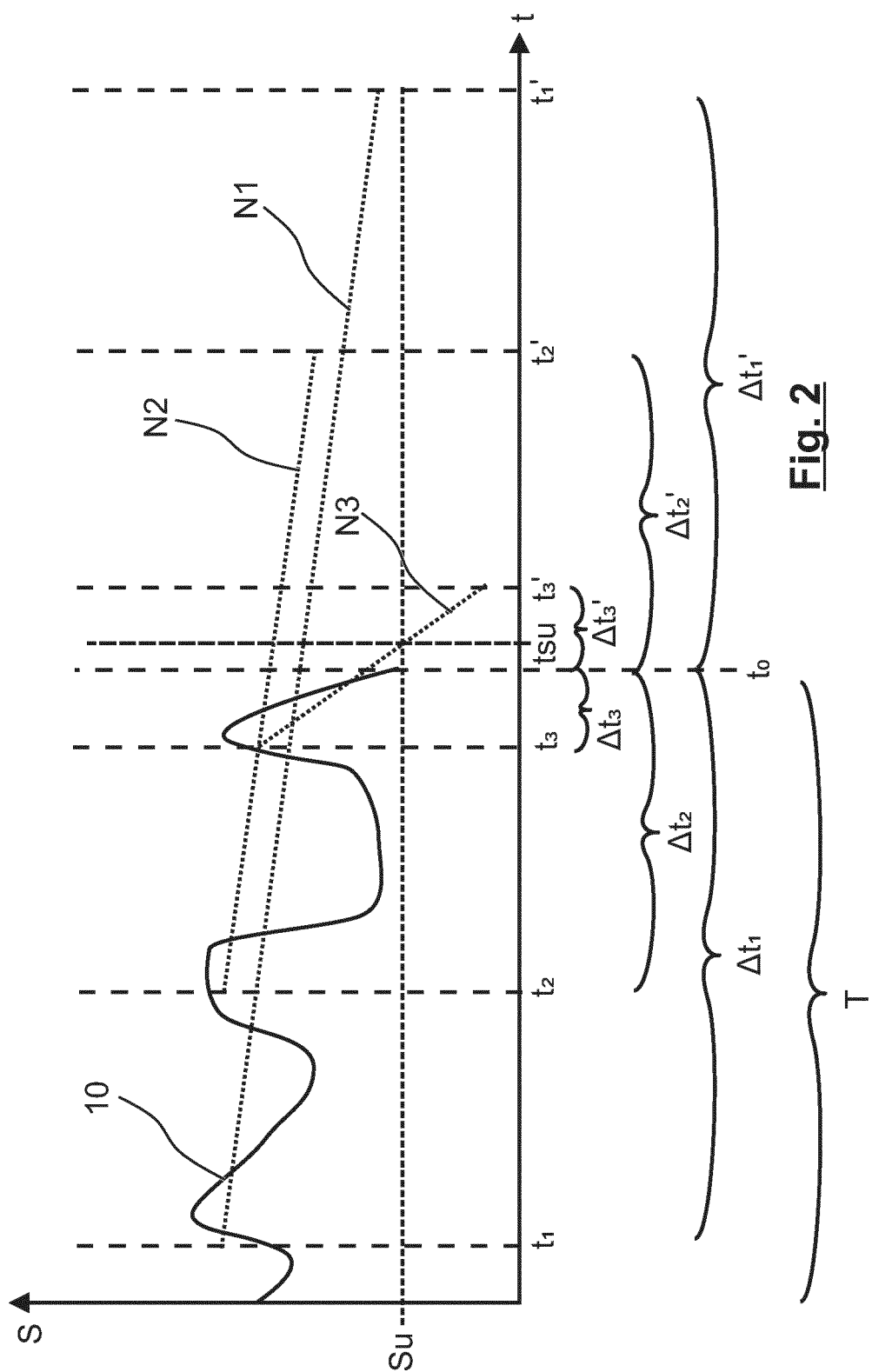
FIG. 2 a further diagram of a system variable over time for explaining a method for predicting the accumulation of ice on a rotor blade of a wind turbine according to a further embodiment.

In FIG. 2, a diagram of a system variable S is represented for explaining the method for predicting the accumulation of ice on a rotor blade of a wind turbine according to an embodiment.

"Accumulation of ice", as used herein, designates an increase or decrease of an ice accretion over time.

In the curve profile of FIG. 1, an increase of the ice accretion over time possibly is to be expected.

The diagram shows various curves in the temporal course t, which are associated with the system variable S. The curve designated by 10 is obtained by measuring a suitable measurand and shows—in the scope of the measurement accuracy and, if necessary, the precision of a required conversion of the measurand into the system variable—a true profile of the system variable S during the acquisition time period T.

This acquisition time period T is at least of the same length as the longest partial time period used for the prediction, as will be explained further below. The acquisition time period, however, may be longer than each of the partial time periods used for the prediction; the measurement data taken as a basis, for example, is acquired continuously or during suitable sampling intervals at the wind turbine permanently during a period of time of several days or similar, and the acquisition time period T corresponds to such a period of time. The partial time periods typically overlap, or a partial time period is completely included in another partial time period, and they are each only differing in length. In FIG. 1, the partial time period $\Delta t_3$ is completely included in the partial time periods $\Delta t_2$ and $\Delta t_1$; the partial time period $\Delta t_2$ is completely included in the partial time period $\Delta t_1$. The same applies to the prediction time periods $\Delta t_1'$, $\Delta t_2'$, $\Delta t_3'$.

In the diagram of FIG. 1, $t_0$ designates the current point of time, i.e. all of the points of time at the right side of $t_0$ are points of time in the future for the purpose of the prediction to be carried out. The acquisition time period T, during which the true progress 10 of the system variable S based on real measurement data is represented, correspondingly ends with the current point of time $t_0$. The disclosure is, however, not restricted to the acquisition time period T always ending with the current point of time $t_0$, and it is conceivable for a prediction of the accumulation of ice on a rotor blade of a wind turbine to be carried out at a current point of time $t_0$ with such a true progress 10 of the system variable S, the acquisition period of which ends prior to the current point of time $t_0$, as long as the true progress 10 of the system variable S is still sufficiently up-to-date.

The system variable S is associated with the mass of the rotor blade. Alternatively, or additionally, the system variable S is associated with the mass of the ice accretion on the rotor blade. Typically, the system variable S is obtained from measurement data of vibration measurements in or at a rotor blade or several of the rotor blades. In embodiments, the measurand is measured in the temporal course of the acquisition time period preferably by measuring vibrations in the temporal course of the acquisition time period, and namely at or in the rotor blade. The system variable is deduced from measurement data, preferably by a natural frequency analysis from the measurement data of the vibration measurements. The system variable S thus allows conclusions to be drawn directly as to the mass of the respective rotor blade or the respective rotor blades and/or to the mass of ice accretion of the respective rotor blade or the respective rotor blades. In embodiments, the system variable is proportional to the total mass of the rotor blade and/or proportional to an additional mass deposit on the rotor blade. An "additional mass deposit on the rotor blade" is such an additional mass deposit that is added to the net mass of the rotor blade. The system variable is typically proportional to the mass of ice.

If a respective prediction by the method is desired, in which a prediction is made whether or not the ice accretion on a rotor blade of the wind turbine (the ice possibly deposited on a rotor blade) will adopt an amount impairing the operation of the wind turbine, an upper threshold value So may be defined appropriately for the system variable S, as shown in the diagram of FIG. 1.

Such an upper threshold value So may be determined empirically, for example, or may be predefined by regulations with respect to the operational safety of the wind turbine. The upper threshold value So, for instance, is a defined upper threshold value for the amount of accumulated ice, e.g. the mass and/or the volume of accumulated ice, upon exceeding of which a safe operation of the wind turbine is no longer permissible or no longer possible.

According to the described embodiment, a compensation calculation of the curve profile for a prediction time period is carried out from the system variable data which were acquired during a partial time period of the acquisition time period T, and at least one further compensation calculation of the curve profile for a further prediction time period is carried out from the system variable data which were acquired during a further partial time period of the acquisition time period T.

In the diagram represented in FIG. 1, a compensation calculation of the curve profile is carried out for a prediction time period $\Delta t_1'$ from the system variable data which were acquired during a partial time period $\Delta t_1$ of the acquisition time period T so that a prediction curve N1 is obtained. Moreover, a compensation calculation of the curve profile is carried out for a prediction time period $\Delta t_2'$ from the system variable data which were acquired during a partial time period $\Delta t_2$ of the acquisition time period T so that a prediction curve N2 is obtained. Finally, a compensation calculation of the curve profile is carried out for a prediction time period $\Delta t_3'$ from the system variable data which were acquired during a partial time period $\Delta t_3$ of the acquisition time period T so that a prediction curve N3 is obtained.

The following is valid for the described embodiment: the time period from the current point of time $t_0$ up to a point of time $t_1'$ in the future is referred to as the prediction time period $\Delta t_1'$. Correspondingly, the time period from the current point of time $t_0$ up to a point of time $t_2'$ in the future is referred to as the prediction time period $\Delta t_2'$, and the time period from the current point of time $t_0$ up to a point of time $t_3'$ in the future is referred to as the prediction time period $\Delta t_3'$.

The time period from a point of time $t_1$ in the past up to the current point of time $t_0$ is referred to as the partial time period $\Delta t_1$. Correspondingly, the time period from a point of time $t_2$ in the past up to the current point of time $t_0$ is referred to as the partial time period $\Delta t_2$, and the time period from a point of time $t_3$ in the past up to the current point of time $t_0$ is referred to as the partial time period $\Delta t_3$.

The compensation calculation may be an appropriate option to determine a probable curve profile for the future mathematically from the true profile 10 of the system variable S in the respective partial time periods $\Delta t_1$, $\Delta t_2$, $\Delta t_3$. Examples of a compensation calculation are regression methods. In embodiments, at least one of the compensation calculations is a linear or a square regression. Preferably, all of the compensation calculations respectively are a linear or a square regression. In the embodiment represented in FIG. 1, all of the prediction curves N1, N2, N3 respectively are obtained from a linear regression.

In embodiments, each of the compensation calculations is respectively carried out for one prediction time period which is at maximum as long as the partial time period of acquired system variable data used for the respective compensation calculation. The respective prediction time period preferably is approximately of the same length as the partial time period of acquired system variable data used for the respective compensation calculation.

In the embodiment represented in FIG. 1, the prediction time period $\Delta t_1'$ for the prediction curve N1 is approximately of the same length as the partial time period $\Delta t_1$ of acquired system variable data of the true profile 10 of the system variable S used for obtaining the prediction curve N1. Correspondingly, the prediction time period $\Delta t_2'$ for the prediction curve N2 is approximately of the same length as the partial time period $\Delta t_2$ of acquired system variable data of the true profile 10 of the system variable S used for obtaining the prediction curve N2, and the prediction time period $\Delta t_3'$ for the prediction curve N3 is approximately of the same length as the partial time period $\Delta t_3$ of acquired system variable data of the true profile 10 of the system variable S used for obtaining the prediction curve N3.

According to the method of the embodiment, it is determined whether or not the upper threshold value So is exceeded in the future by one or more of the prediction curves N1, N2, N3 and/or whether or not a lower threshold value Su of one or more predictions curves N1, N2, N3 is undershot in the future by one or more of the prediction curves N1, N2, N3. According to the method of the embodiment, the result of the determination is output, for example to a suitable evaluating device.

In the represented embodiment according to FIG. 1, the threshold value So is not exceeded by the curve N1 in the prediction time period $\Delta t_1'$ provided for it (i.e. up to the point of time $t_1'$). Nor is the threshold value So exceeded by the curve N3 in the prediction time period $\Delta t_3'$ provided for it (i.e. up to the point of time $t_3'$).

Curve N2, however, exceeds the threshold value So in the prediction time period $\Delta t_2'$ relevant for it (i.e. up to the point of time $t_2'$). Hence, the result is output that one of the curves will exceed the defined upper threshold value So. This may be analogous to the determination that ice will be accumulated in the future.

If it is determined that already at the current point of time $t_0$ the upper threshold value is exceeded by the true curve 10 of the system variable S, the result may of course be also output that the upper threshold value So is already exceeded, or a corresponding ice warning message may be output.

In FIG. 2, a diagram of a system variable S for explaining a method for predicting the accumulation of ice on a rotor blade of a wind turbine according to a further embodiment is represented. The representation of FIG. 2 is analogous to that in FIG. 1, and repeated descriptions will be omitted here.

In the curve profile of FIG. 2, a decrease of the ice accretion over the time can be expected in contrast to the curve profile from FIG. 1. A lower threshold value Su for the system variable S is defined, which indicates a minimum value for the ice accretion, and below which an operation of the wind turbine probably is possible. A combination of the basic procedure from FIG. 1 with that described here for FIG. 2 is possible, i.e. it is possible for an upper threshold value So and a lower threshold value Su to be defined, which do not necessarily have to coincide.

The procedure of the compensation calculations is comparable to that of FIG. 1. Accordingly, the threshold value So is not undershot according to the embodiment from FIG. 2 by the curve N1 in the prediction time period $\Delta t_1'$ provided for it (i.e. up to the point of time $t_1'$), the threshold value So is not undershot by the curve N2 in the prediction time period $\Delta t_2'$ provided for it (i.e. up to the point of time $t_2'$), but the threshold value So is undershot by the curve N3 in the prediction time period $\Delta t_3'$ provided for it (i.e. up to the point of time $t_3'$). Hence, the result is output that one of the curves will undershoot the defined lower threshold value Su. This may be analogous to the determination that a sufficient amount of ice will be thawing in the future.

It is provided in embodiments that, if it is determined that the upper threshold value So will be exceeded in the future by one or more of the prediction curves N1, N2, N3, an ice warning message will be output. In the diagram represented in FIG. 1, such an ice warning message can be output, since the curve N2 exceeds the upper threshold value So.

Alternatively, or additionally, it is provided in embodiments that, if it is determined that the lower threshold value Su will be undershot in the future by one or more of the prediction curves N1, N2, N3, a free-of-ice message will be output. In the diagram represented in FIG. 2, such a free-of-ice message can be output, since the curve N3 undershoots the lower threshold value Su.

In this context, it is possible for the ice warning message or the free-of-ice message to make provisions for a delayed response, for example a switch-off of the wind turbine, only after a certain delay following the ice warning message, or a switch-on of the wind turbine only after a certain delay following the free-of-ice message.

It is provided according to an embodiment for a prospective exceeding point of time tso, when a minimum amount of ice on a rotor blade is exceeded, to be determined and/or output. Alternatively, or in addition, it is provided according to an embodiment for a prospective undershooting point of time tsu, when a maximum amount of ice on a rotor blade is undershot, to be determined and/or output.

The exceeding point of time tso is shown in FIG. 1 by way of example as being between the point of time $t_3'$ and the point of time $t_2'$. Correspondingly, the undershooting point of time tsu is shown in FIG. 2 by way of example as being between the point of time $t_0$ and the point of time $t_3'$.

Deducing an undershooting point of time tso and/or an exceeding point of time tsu may contribute to better coordinate measures associated with an ice warning message and/or a free-of-ice message.

It is provided according to an embodiment for a probability to be deduced whether or not a minimum amount of ice will be accumulated on a rotor blade, especially from the respective prediction time period $\Delta t_1'$, $\Delta t_2'$, $\Delta t_3'$ and/or from the respective exceeding point of time tso and/or from the respective curve profile of the respective prediction curve N1, N2, N3. Alternatively, or additionally, it is provided according to an embodiment for a probability to be deduced, whether or not a maximum amount of accumulated ice on a rotor blade will be undershot, especially from the respective prediction time periods $\Delta t_1'$, $\Delta t_2'$, $\Delta t_3'$ and/or from the respective exceeding point of time tso and/or from the respective curve profile of the respective prediction curve N1, N2, N3.

Deducing a probability may contribute to better coordinate measures associated with an ice warning message and/or a free-of-ice message.

It is provided according to an embodiment for an amount of ice, that is expected to accumulate on a rotor blade, to be deduced from the respective prediction time periods $\Delta t_1'$, $\Delta t_2'$, $\Delta t_3'$ and/or from the respective exceeding point of time tso and/or from the respective curve profile of the respective prediction curves N1, N2, N3.

Deducing the amount of ice may contribute to better coordinate measures associated with an ice warning message and/or a free-of-ice message.

According to an embodiment, at least one of the partial time periods $\Delta t_1$, $\Delta t_2$, $\Delta t_3$ has a length of approximately one hour or more. Preferably, at least three compensation calculations are carried out, and the respective partial time periods thereof have a length of about 1 hour, about 2 hours or about 4 hours.

According to an embodiment, the lengths of the respective partial time periods $\Delta t_1$, $\Delta t_2$, $\Delta t_3$ are defined in advance. The lengths of the respective partial time periods $\Delta t_1$, $\Delta t_2$, $\Delta t_3$ preferably are defined in advance as a function of the location of the wind turbine and/or as a function of meteorological supporting data.

The partial time periods $\Delta t_1$, $\Delta t_2$, $\Delta t_3$ may be defined, for example, to have comparably short lengths when the meteorological supporting data indicate a likelihood of ice to accumulate. Correspondingly, the partial time periods $\Delta t_1$, $\Delta t_2$, $\Delta t_3$ may be defined to have comparably great lengths when the meteorological supporting data indicate a reduced likelihood of ice to accumulate.

For example, the partial time periods $\Delta t_1$, $\Delta t_2$, $\Delta t_3$ may be defined alternatively or additionally to have comparably short lengths also in a wind turbine at a location where an accumulation of ice is likely. Correspondingly, the partial time periods $\Delta t_1$, $\Delta t_2$, $\Delta t_3$ may be defined to have comparably great lengths in a wind turbine at a location where an accumulation of ice is less likely.

In embodiments, the lengths of the respective partial time periods $\Delta t_1$, $\Delta t_2$, $\Delta t_3$ may be adjusted during the operation of the wind turbine as a function of a plant size of the wind turbine. The lengths may be adjusted, for example, as a function of the rotor blade speed of the rotor blades of the wind turbine and/or as a function of meteorological supporting data.

The partial time periods $\Delta t_1$, $\Delta t_2$, $\Delta t_3$ may be shortened in their lengths, for example, when the meteorological supporting data indicate that an accumulation of ice is likely. Correspondingly, the partial time periods $\Delta t_1$, $\Delta t_2$, $\Delta t_3$ may be extended in their lengths, for example, when the meteorological supporting data indicate that an accumulation of ice is less likely.

For example, the partial time periods $\Delta t_1$, $\Delta t_2$, $\Delta t_3$ may also be shortened in their lengths alternatively or additionally at an increasing rotor blade speed. An increasing rotor blade speed may promote an accumulation of ice. Correspondingly, the partial time periods $\Delta t_1$, $\Delta t_2$, $\Delta t_3$ may be shortened in their lengths at a decreasing rotor blade speed. A decreasing rotor blade speed may reduce the likelihood of ice to accumulate.

In an embodiment, the method described herein is used for determining the operating parameters of a rotor blade de-icing device which are required for a de-icing process. The timing of the start-up of such a rotor blade de-icing device may be determined, for example based on the prediction result and/or based on the point of time tso of the expected exceeding of the upper threshold value So for a satisfying de-icing result at a low energy expenditure. For example, the timing of the shut down of such a rotor blade de-icing device may also be determined based on the prediction result and/or based on the point of time tsu of the expected undershooting of the lower threshold value Su for a satisfying de-icing result at a low energy expenditure.

Figure 3:
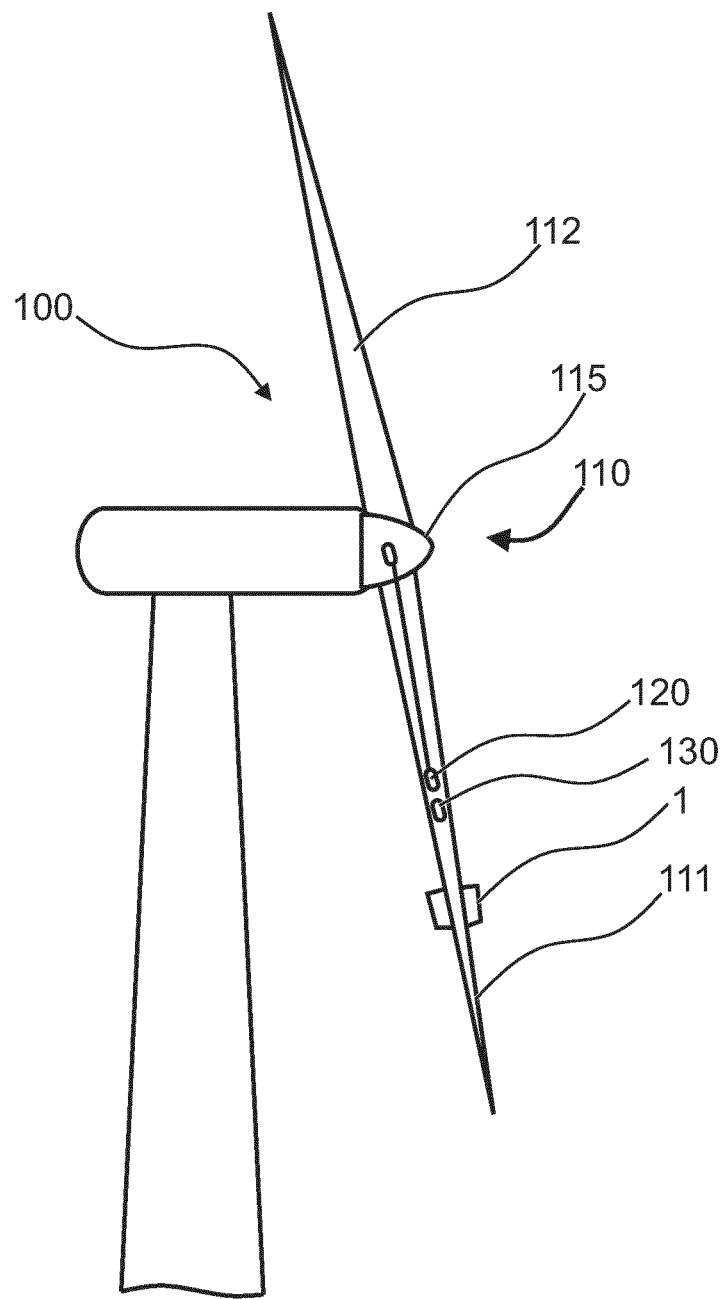
FIG. 3 a schematic representation of a wind turbine, in which the method according to one of the embodiments described herein may be applied.

FIG. 3 shows a wind turbine 100 by way of example, in which the method described herein may be applied. The wind turbine includes a rotor 115 to the rotor hub 110 of which three rotor blades are mounted, a first rotor blade 111 and a second rotor blade 112 being shown in the side view of FIG. 3. For the sake of better representation, the operating means described below are only illustrated on the first rotor blade 111; but may also be present on further or all of the rotor blades.

An ice attachment 1 is schematically illustrated in the area of the rotor blade tip. The vibrations in the rotor blade are detected by means of a rotor blade sensor 120 configured as a vibration sensor according to the embodiment. Furthermore, a rotor blade de-icing device 130 is provided. The rotor blade de-icing device 130 may extend over wide parts of the respective rotor blade 111, 112 or essentially over the entire extension thereof.

Figure 4:
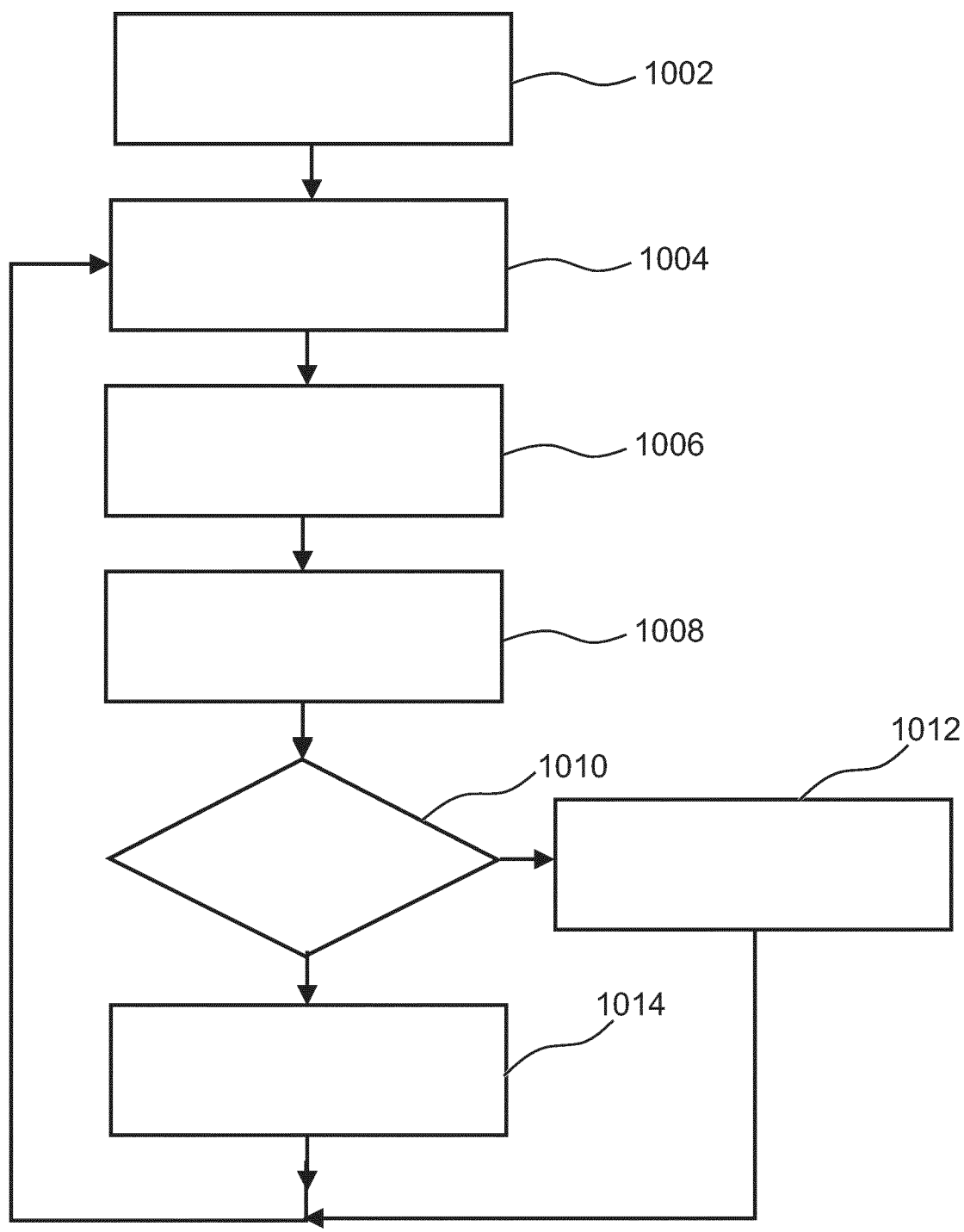
FIG. 4 a flow chart of a method for predicting the accumulation of ice on a rotor blade of a wind turbine according to an embodiment.

FIG. 4 shows a flow chart of a method for predicting the accumulation of ice on a rotor blade 111, 112 of a wind turbine 100.

In a step 1002 of the method, an upper threshold value So and/or a lower threshold value Su is/are defined for a system variable S. The system variable S is associated with the masse of the rotor blade 111, 112 and/or with the mass of an ice attachment 1 of the rotor blade 111, 112.

In a step 1004 of the method, system variable data is acquired during an acquisition period of time T.

In a step 1006 of the method, a compensation calculation of the curve profile is carried out for a prediction time period $\Delta t_1'$, $\Delta t_2'$, $\Delta t_3'$ from the system variable data acquired during a partial time period $\Delta t_1$, $\Delta t_2$, $\Delta t_3$ of the acquisition time period T, in order to obtain a prediction curve N1, N2, N3.

In a step 1008 of the method, a compensation calculation of the curve profile is carried out for a further prediction time period $\Delta t_1'$, $\Delta t_2'$, $\Delta t_3'$ from the system variable data acquired during a further partial time period $\Delta t_1$, $\Delta t_2$, $\Delta t_3$ of the acquisition time period T, in order to obtain a further prediction curve N1, N2, N3.

In a step 1010 of the method, it is determined whether or not the upper threshold value So will be exceeded in the future by one or more of the prediction curves N1, N2, N3 and/or whether or not a lower threshold value Su will be undershot in the future by one or more of the prediction curves N1, N2, N3.

If it is determined that the upper threshold value So will be exceeded in the future by one or more of the prediction curves N1, N2, N3 or the lower threshold value Su will be undershot in the future by one or more of the prediction curves N1, N2, N3, the method proceeds to step 1012. If it is determined that the upper threshold value So will not be exceeded in the future by one or more of the prediction curves N1, N2, N3 or the lower threshold value Su will not be undershot in the future by one or more of the prediction curves N1, N2, N3, the method proceeds to step 1014.

In step 1012 is output as the result of the determination that the upper threshold value So will be exceeded in the future by one or more of the prediction curves N1, N2, N3 or that the lower threshold value Su will be undershot in the future by one or more of the prediction curves N1, N2, N3.

In step 1014 is output as the result of the determination that the upper threshold value So will not be exceeded in the future by one or more of the prediction curves N1, N2, N3 or that the lower threshold value Su will not be undershot in the future by one or more of the prediction curves N1, N2, N3.

After the step 1012 or after the step 1014, the method returns to step 1004.

It should be noted at this point that the aspects and embodiments described herein may be appropriately combined with each other, and that single aspects may be omitted where it is reasonable and possible in the scope of expert action. The expert is familiar with modifications of and complements to the aspects described herein.

The invention claimed is:

1. A method for predicting the accumulation of ice on a rotor blade of a wind turbine, comprising:
    defining at least one of an upper threshold value or a lower threshold value for a system variable, which is associated with at least one of the mass of the rotor blade, or the mass of an ice attachment of the rotor blade;
    acquiring system variable data during an acquisition time period for obtaining a curve profile of the system variable during the acquisition time period;
    carrying out a compensation calculation of the curve profile for a prediction time period from the system variable data which were acquired during a partial time period of the acquisition time period in order to obtain a prediction curve;
    carrying out at least one further compensation calculation of the curve profile for a further prediction time period from the system variable data which were acquired during another partial time period of the acquisition time period in order to obtain a further prediction curve;
    determining at least one of whether or not the upper threshold value will be exceeded by one or more of the prediction curves in the future, or whether or not the lower threshold value will be undershot by one or more of the prediction curves in the future; and
    outputting the result of the determination.

2. The method according to claim 1, further comprising at least one of:
    if it is determined that the upper threshold value will be exceeded by one or more of the prediction curves in the future, an ice warning message is output; or
    if it is determined that the lower threshold value will be undershot by one or more of the prediction curves in the future, a free-of-ice message is output.

3. The method according to claim 1,
    wherein
    the system variable is proportional to at least one of the total mass of the rotor blade, or an additional deposit on the mass of the rotor blade.

4. The method according to claim 1,
    further comprising:
    determining and outputting at least one of
    a prospective exceeding point of time when a minimum amount of ice on the rotor blade will be exceeded, or
    a prospective undershooting point of time when a maximum amount of ice on the rotor blade will be undershot.

5. The method according to claim 1,
    wherein the acquiring of system variable data comprises:
    measuring a measurand in the temporal course of the acquisition time period; and
    deducing the system variable from the measurement data.

6. The method according to claim 5,
    wherein the measuring the measurand is measuring vibrations at or in the rotor blade.

7. The method according to claim 6,
    wherein the deducing the system variable is deducing the system variable by a natural frequency analysis.

8. The method according to claim 1,
    wherein each of the compensation calculations is respectively carried out for a prediction time period in the future, which is at maximum as long as the partial time period of acquired system variable data used for the respective compensation calculation.

9. The method according to claim 8,
    wherein the prediction time period is of the same length as the partial time period of the acquired system variable data.

10. The method according to claim 1,
    further comprising at least one of:
    deducing a probability, whether or not a minimum amount of ice will be accumulated on a rotor blade, from at least one of the respective prediction time period, the respective exceeding point of time, or the respective curve profile of the respective prediction curve; or
    deducing a probability, whether or not a maximum amount of accumulated ice on a rotor blade will be undershot, from at least one of the respective prediction time period, the respective undershooting point of time, or the respective curve profile of the respective prediction curve.

11. The method according to claim 1, further comprising:
    deducing the amount of ice which is expected to be accumulated on the rotor blade, from at least one of the respective prediction time period, the respective exceeding point of time, or the respective curve profile of the respective prediction curve.

12. The method according to claim 1,
    wherein at least one of the compensation calculations is a linear or a square regression.

13. The method according to claim 12,
    wherein all of the compensation calculations are a linear or a square regression.

14. The method according to claim 1,
    wherein the partial time periods has a length of approximately one hour or more and the respective partial time periods thereof have a length of about 1 hour, about 2 hours or about 4 hours.

15. The method according to claim 14,
    wherein at least three compensation calculations are carried out.

16. The method according to claim 1,
    wherein the lengths of the respective partial time periods are defined in advance.

17. The method according to claim 16,
    wherein the lengths of the respective partial time periods are defined in advance as at least one of a function of the location of the wind turbine, or a function of meteorological supporting data.

18. The method according to claim 1,
    wherein the lengths of the respective partial time periods are adjusted during the operation of the wind turbine as a function of the plant size of the wind turbine.

19. The method according to claim 1,
    wherein the lengths of the respective partial time periods are adjusted during the operation of the wind turbine as at least one of a function of the rotor blade speed of the rotor of the wind turbine, or a function of meteorological supporting data.

* * * * *